(12) United States Patent
Mei et al.

(10) Patent No.: US 11,860,050 B2
(45) Date of Patent: Jan. 2, 2024

(54) LOAD DETECTOR

(71) Applicants: Measurement Specialties, Inc., Hampton, VA (US); Measurement Specialties (China) Ltd., Shenzhen (CN)

(72) Inventors: Hai Mei, Pelham, NH (US); Xuetang Zhao, Shenzhen (CN); Qineng Hu, Shenzhen (CN); Guohua Wu, Shenzhen (CN)

(73) Assignees: Measurement Specialties (China) Ltd., Shenzhen (CN); TE Connectivity Solutions GmbH, Schaffhausen (CH)

( * ) Notice: Subject to any disclaimer, the term of this patent is extended or adjusted under 35 U.S.C. 154(b) by 143 days.

(21) Appl. No.: 17/208,247

(22) Filed: Mar. 22, 2021

(65) Prior Publication Data
US 2021/0302244 A1 Sep. 30, 2021

(30) Foreign Application Priority Data
Mar. 26, 2020 (CN) .......................... 202010223855.6

(51) Int. Cl.
*G01L 1/22* (2006.01)
*G01L 1/04* (2006.01)
*G01L 1/14* (2006.01)

(52) U.S. Cl.
CPC ............ *G01L 1/2293* (2013.01); *G01L 1/042* (2013.01); *G01L 1/142* (2013.01)

(58) Field of Classification Search
CPC ....... G01L 1/2293; G01L 1/042; G01L 1/142; G01L 1/044; G01L 1/22; G01L 1/2206; G01L 1/04; G01G 21/23; G01G 21/00
See application file for complete search history.

(56) References Cited

U.S. PATENT DOCUMENTS 6,534,711 B1 * 3/2003 Pollack ................... H01L 23/24
174/530
7,476,952 B2 * 1/2009 Vaganov ............... G06F 3/0338
257/730
(Continued)

FOREIGN PATENT DOCUMENTS

CN 101672705 A 3/2010
CN 102012288 A 4/2011
(Continued)

OTHER PUBLICATIONS

First Office Action from the CNIPA with English translation corresponding to Application No. 2020102238556, 14 pages.
(Continued)

*Primary Examiner* — Freddie Kirkland, III
(74) *Attorney, Agent, or Firm* — Barley Snyder

(57) ABSTRACT

A load detector includes a housing having a height direction, and a load sensor provided within the housing. The load detector further includes a base platform, an elastic beam and an elastic member, the base being floatingly supported on the housing by the elastic beam, and the elastic member being provided on the base platform for receiving a load force. With the load force is applied to the elastic member, the elastic beam and the elastic member are simultaneously elastically deformed in the height direction, and the load force is transmitted to the load sensor via the base platform. The base platform is floatingly supported on the housing by the elastic beam, so that a high sensitivity of the load sensor may be enabled and the load sensor may be prevented from damage caused by excessive load.

18 Claims, 5 Drawing Sheets

(56) References Cited

U.S. PATENT DOCUMENTS

| | | | |
|---|---|---|---|
| 8,220,343 B2* | 7/2012 | Hatanaka | G01L 5/223 |
| | | | 73/862.632 |
| 8,648,267 B2* | 2/2014 | Honda | G01G 21/244 |
| | | | 177/DIG. 9 |
| 9,034,666 B2* | 5/2015 | Vaganov | G06F 3/0338 |
| | | | 324/750.01 |
| 9,664,576 B2* | 5/2017 | Sato | G01L 1/2225 |
| 9,823,144 B2* | 11/2017 | Fujisawa | G01L 1/2231 |
| 9,995,651 B2* | 6/2018 | Nakagawa | G01M 13/04 |
| 2007/0264743 A1* | 11/2007 | Vaganov | G06F 3/0338 |
| | | | 438/51 |
| 2010/0011885 A1* | 1/2010 | Ohsato | G01L 1/18 |
| | | | 73/862.627 |
| 2010/0170349 A1* | 7/2010 | Hatanaka | G01L 5/1627 |
| | | | 73/862.627 |
| 2015/0241287 A1 | 8/2015 | Sato | |
| 2018/0217016 A1* | 8/2018 | Inamori | G01L 1/22 |

FOREIGN PATENT DOCUMENTS

| | | |
|---|---|---|
| CN | 102135458 A | 7/2011 |
| CN | 104165679 A | 11/2014 |
| CN | 105938001 A | 9/2016 |
| CN | 110319912 A | 10/2019 |

OTHER PUBLICATIONS

Second Office Action from the National Intellectual Property Administration Office of China dated Mar. 11, 2023, corresponding to Application No. 202010223855.6 with English translation, 15 pages.

* cited by examiner

LOAD DETECTOR

CROSS-REFERENCE TO RELATED APPLICATIONS

This application claims priority under 35 U.S.C. § 119 to Chinese Patent Application No. 202010223855.6, filed on Mar. 26, 2020.

FIELD OF THE INVENTION

The present invention relates to sensors, and more particularly, to sensors and sensor assemblies for detecting loads.

BACKGROUND

According to the prior art, a load detector, for example, a scale for weighting, typically includes a housing, a load sensor and an elastic block. For example, in U.S. 2015241287A1, a load detector is disclosed in which an elastic block is supported on a housing and is in contact with a load sensor. When a load force is applied to the elastic block, a large part of the load force will be transmitted to the housing and not to the load sensor, thereby reducing the sensitivity of the load detector.

SUMMARY

In one embodiment of the present disclosure, a load detector includes a housing having a height direction, and a load sensor provided within the housing. The load detector further includes a base platform, an elastic beam and an elastic member. The base is floatingly supported on the housing by the elastic beam, and the elastic member is provided on the base platform for receiving a load force. When the load force is applied to the elastic member, the elastic beam and the elastic member are simultaneously elastically deformed in the height direction, and the load force is transmitted to the load sensor via the base platform. The base platform is floatingly supported on the housing by the elastic beam, so that a high sensitivity of the load sensor may be enabled and the load sensor may be prevented from damage caused by excessive load.

BRIEF DESCRIPTION OF THE DRAWINGS

The invention will now be described by way of example with reference to the accompanying Figures, of which.

DETAILED DESCRIPTION OF THE EMBODIMENTS

Figure 1:
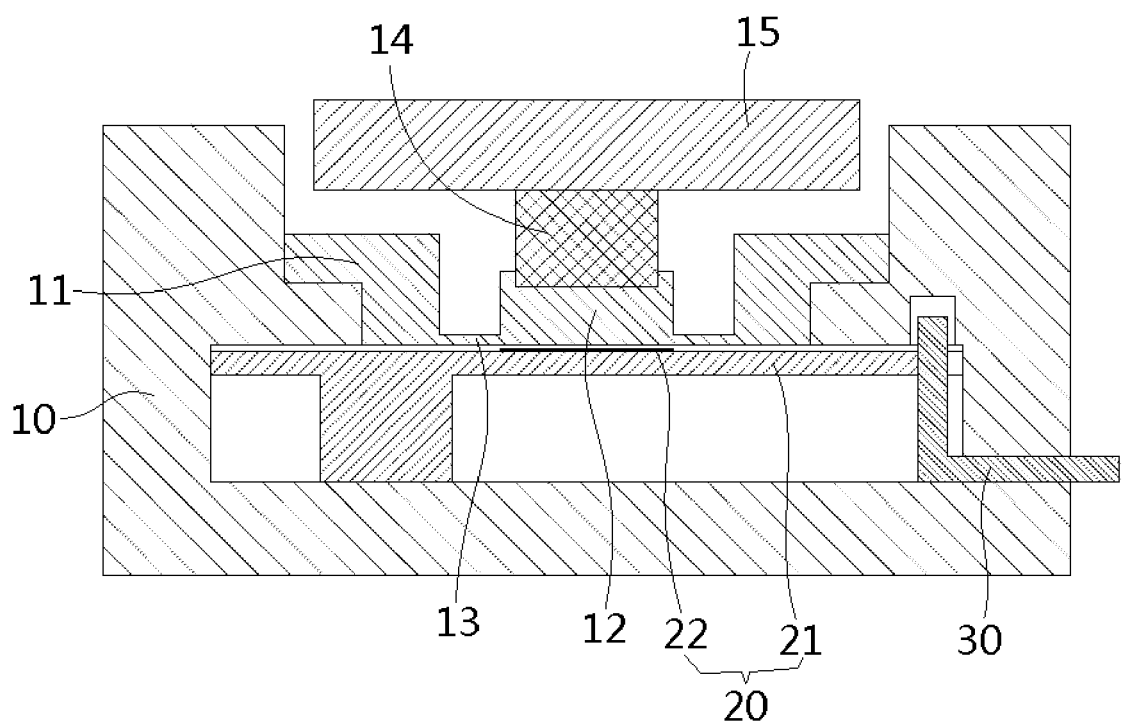
FIG. 1 shows a schematic view of a load detector according to a first embodiment of the present disclosure, wherein a top platform is in an initial position.

Technical solutions of the present disclosure will be described hereinafter in detail through embodiments and with reference to the attached drawings. In the specification, the same or the like reference numerals refer to the same or the like elements. The illustration of the embodiments of the present disclosure made with reference to the attached drawings is aimed to explain the general inventive concept of the present disclosure, not to be construed as a limitation of the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 2:
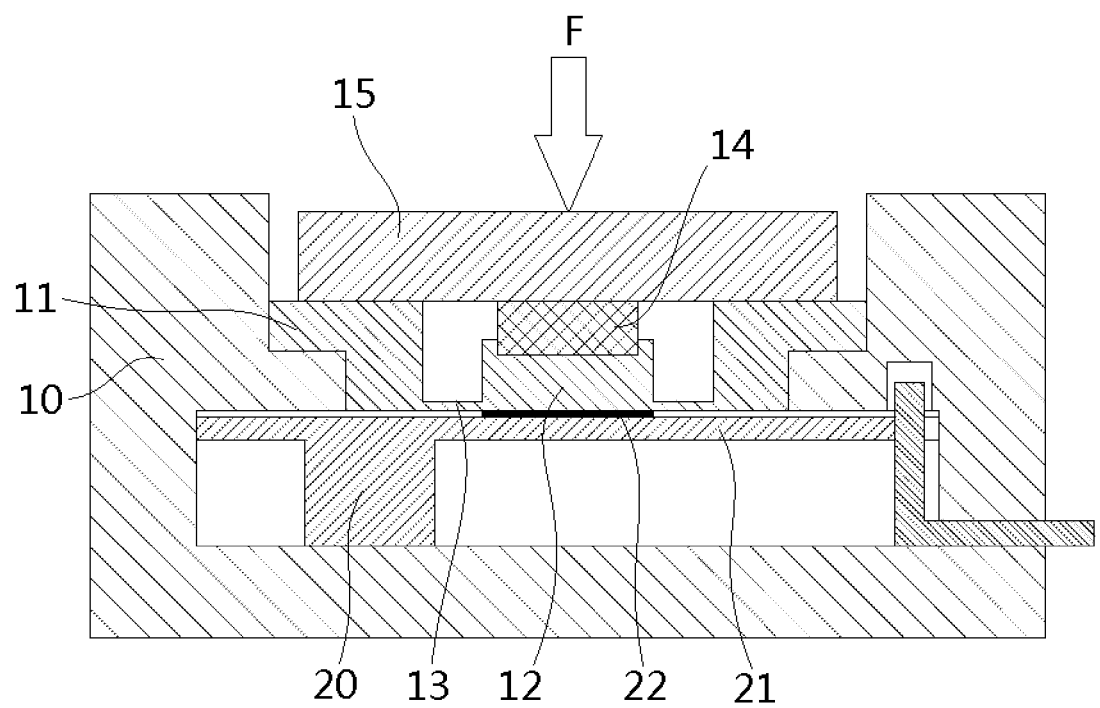
FIG. 2 shows a schematic view of the load detector according to the first embodiment of the present disclosure, wherein the top platform is in a predetermined position.

FIG. 1 shows a schematic view of a load detector according to a first embodiment of the present disclosure, wherein a top platform is in an initial position. FIG. 2 shows a schematic view of the load detector according to the first embodiment of the present disclosure, wherein the top platform is in a predetermined position.

In the illustrated embodiment, as shown in FIGS. 1 and 2, the load detector mainly comprises a housing 10, a load sensor 20, a base platform 12, an elastic beam 13 and an elastic member (14, 14', 14"). The housing 10 has a height direction. The load sensor 20 is provided within the housing 10.

In the illustrated embodiment, as shown in FIGS. 1 and 2, the base platform 12 is floatingly supported on the housing 10 by the elastic beam 13, and the elastic member (14, 14', 14") is provided on the base platform 12, for receiving a load force F. In this way, when the load force F is applied to the elastic member (14, 14', 14"), the elastic beam 13 and the elastic member (14, 14', 14") are simultaneously elastically deformed in the height direction, and the load force F is transmitted to the load sensor 20 via the base platform 12.

In the illustrated embodiment, as shown in FIGS. 1 and 2, the load detector further comprises a supporting portion 11 supported on the housing 10, one end of the elastic beam 13 is connected to the base platform 12, and the other end of the elastic beam 13 is connected to the supporting portion 11.

In the illustrated embodiment, as shown in FIGS. 1 and 2, the supporting portion 11, the base platform 12 and the elastic beam 13 are integrated into a single component or one piece.

In the illustrated embodiment, as shown in FIGS. 1 and 2, the load detector further comprises a top platform 15 floatingly supported on the base platform 12 by the elastic member (14, 14', 14"), and the load force F is applied to the elastic member (14, 14', 14") via the top platform 15.

In the illustrated embodiment, as shown in FIGS. 1 and 2, when the load force F applied to the top platform 15 is greater than a predetermined pressing force, the top platform 15 is blocked at a predetermined position by the housing 10 to prevent the load sensor 20 from being subjected to a pressing force greater than the predetermined pressing force.

In the illustrated embodiment, as shown in FIG. 2, when the load force F applied to the top platform 15 is greater than the predetermined pressing force, the top platform 15 is in contact with the supporting portion 11 or the housing 10, thereby being blocked at the predetermined position shown in FIG. 2.

In the illustrated embodiment, as shown in FIGS. 1 and 2, the elastic member (14, 14', 14") is an elastic block 14 made of an elastic material, and the elastic block 14 is provided between the base platform 12 and the top platform 15.

In the illustrated embodiment, as shown in FIGS. 1 and 2, at least one of the base platform 12 and the top platform 15 is formed with a positioning groove adapted to position the elastic block 14, the elastic block 14 being positioned in the positioning groove.

In the illustrated embodiment, as shown in FIGS. 1 and 2, the load sensor 20 is a resistive strain gauge sensor, a semiconductor strain gauge sensor, a capacitive sensor or other suitable type of load sensor.

In the illustrated embodiment, as shown in FIGS. 1 and 2, the load sensor 20 comprises a circuit board 21 and a strain gauge 22 provided on the circuit board 21 and electrically connected to the circuit board 21.

In the illustrated embodiment, as shown in FIGS. 1 and 2, the load detector further comprises a lead wire 30 electrically connected to the load sensor 20 and extending from the housing 10 for connection to a user interface or other device.

In the illustrated embodiment, as shown in FIGS. 1 and 2, the base platform 12 is adapted to be in contact with the strain gauge 22 of the load sensor 20 to transmit the load force F to the strain gauge 22.

Figure 3:
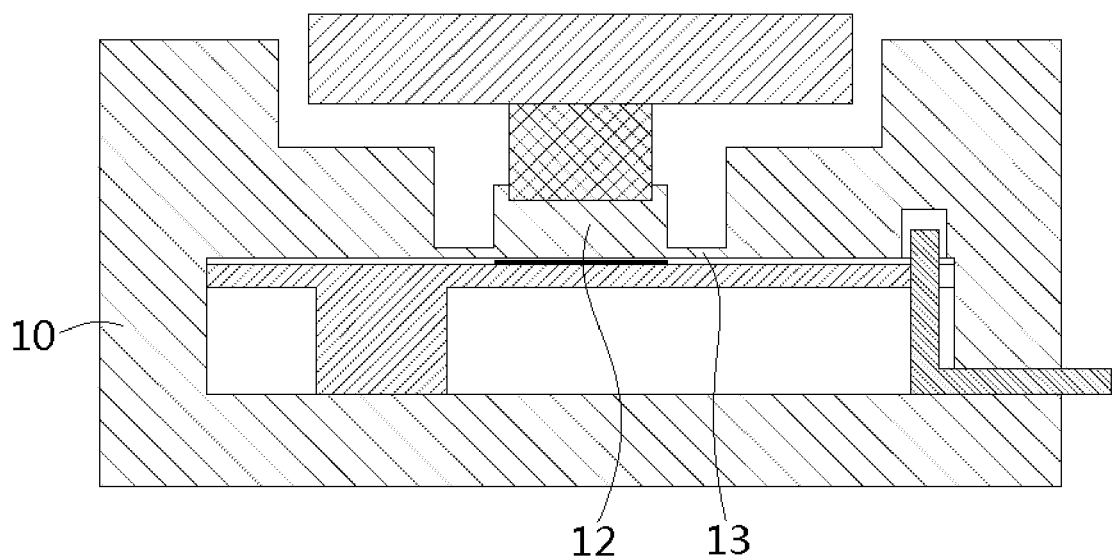
FIG. 3 shows a schematic view of a load detector according to a second embodiment of the present disclosure.

FIG. 3 shows a schematic view of a load detector according to a second embodiment of the present disclosure.

The second embodiment, as shown in FIG. 3, is substantially the same as the first embodiment shown in FIGS. 1 and 2 except that the housing 10, the base platform 12 and the elastic beam 13 are integrated into a single component. As shown, one end of the elastic beam 13 is connected to the base platform 12, and the other end of the elastic beam 13 is connected to the housing 10. A remainder of the same or similar technical features will not be described again for the sake of brevity.

Figure 4:
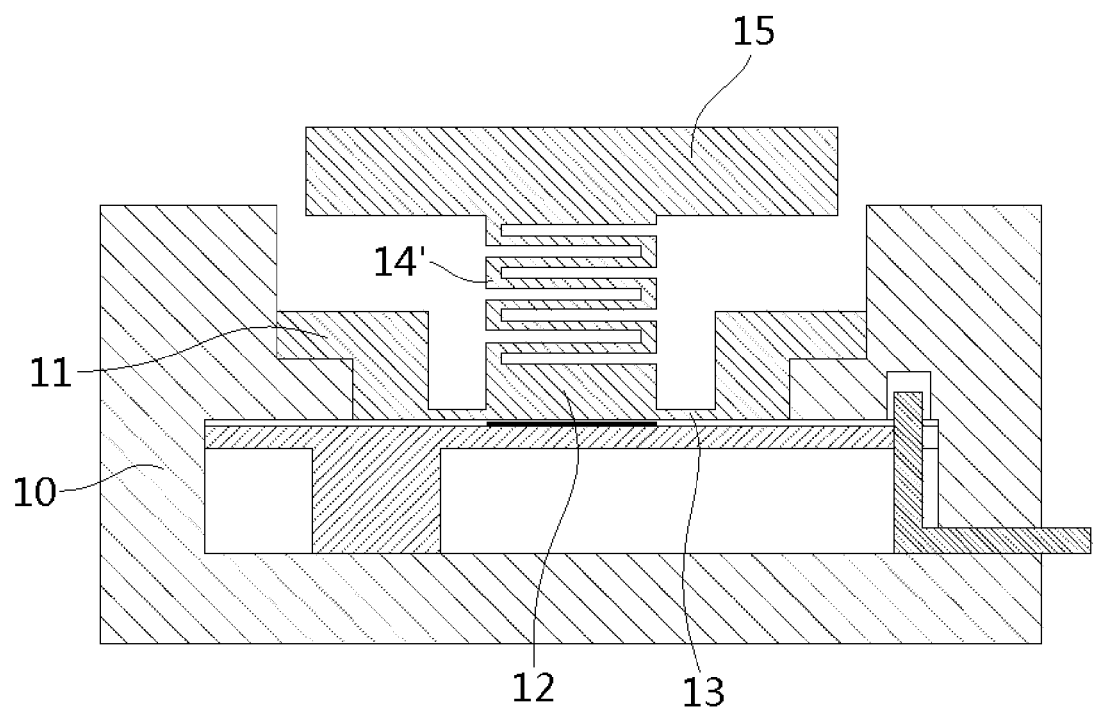
FIG. 4 shows a schematic view of a load detector according to a third embodiment of the present disclosure.

FIG. 4 shows a schematic view of a load detector according to a third embodiment of the present disclosure.

The third embodiment, as shown in FIG. 4, is substantially the same as the first embodiment shown in FIGS. 1 and 2 except that the base platform 12, the elastic member (14, 14', 14") and the top platform 15 are integrated into a single component. More specifically, the elastic member (14, 14', 14") is an elastically deformable elastic structural body 14' formed between the base platform 12 and the top platform 15. A remainder of the same or similar technical features will not be described again for the sake of brevity.

Figure 5:
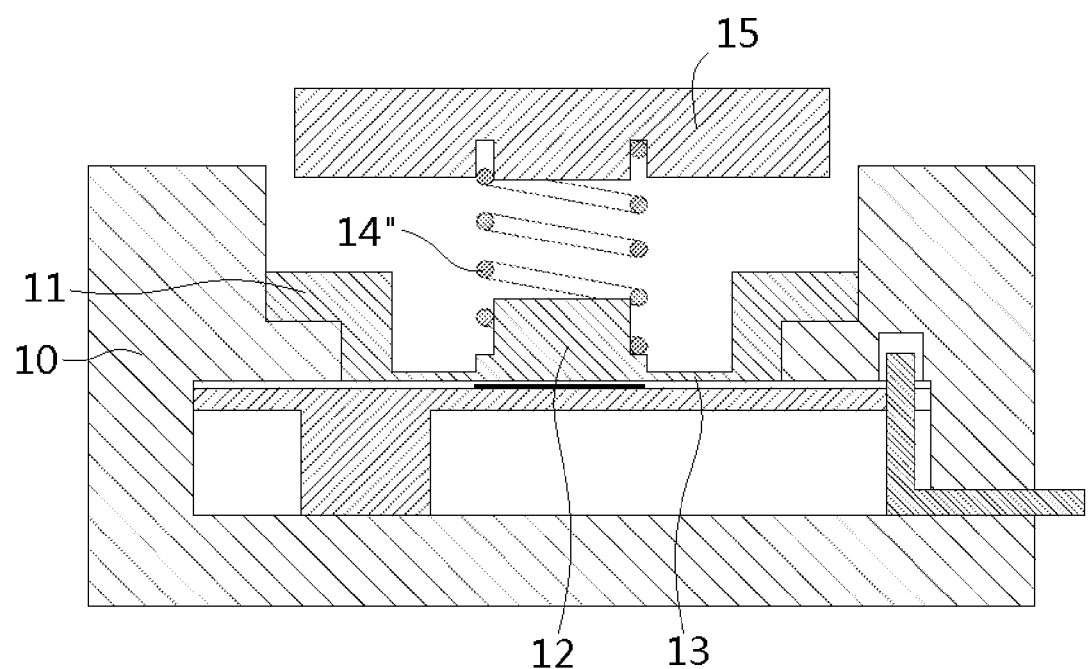
FIG. 5 shows a schematic view of a load detector according to a forth embodiment of the present disclosure.

FIG. 5 shows a schematic view of a load detector according to a fourth embodiment of the invention.

The fourth embodiment, as shown in FIG. 5, is substantially the same as the first embodiment shown in FIGS. 1 and 2 except that the elastic member (14, 14', 14") is a spring element 14" provided between the base platform 12 and the top platform 15. As illustrated, at least one of the base platform 12 and the top platform 15 is formed with a positioning groove adapted to position the spring element 14", and the spring element 14" is positioned in the positioning groove. A remainder of the same or similar technical features will not be described again for the sake of brevity.

It is noted that the present disclosure is not limited to the illustrated embodiments, for example, the spring element 14" shown in FIG. 5 may be welded, bonded or attached to at least one of the base platform 12 and the top platform 15.

In each of the illustrated embodiments, the load force F is a pressing load or force applied to the elastic member (14, 14', 14"), and the load detector is used to detect the pressing load or force. However, the present disclosure is not limited to this, and the load force F may be a tension load or force applied to the elastic member (14, 14', 14"), and the load detector used to detect the tension load or force, and in this case, it is only necessary to make appropriate changes to the illustrated embodiments.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle.

Although the present disclosure have been described hereinbefore in detail with reference to the attached drawings, it should be appreciated that the disclosed embodiments in the attached drawings are intended to illustrate the preferred embodiments of the present disclosure by way of example, and should not be construed as limitation to the present disclosure.

Although several exemplary embodiments have been shown and described, it would be appreciated by those skilled in the art that various changes or modifications may be made to these embodiments without departing from the principles and spirit of the invention, the scope of which is defined by the claims and their equivalents.

It should be noted that, the word "comprise" doesn't exclude other elements or steps, and the word "a" or "an" doesn't exclude more than one. In addition, any reference numerals in the claims should not be interpreted as the limitation to the scope of the present disclosure.

What is claimed is:

1. A load detection apparatus, comprising:
   a housing having a height direction;
   a load sensor provided within the housing;
   a base platform;
   an elastic beam; and
   an elastic member, the base platform being floatingly supported on the housing by the elastic beam, the elastic member being provided on the base platform for receiving a load force, with the load force is applied to the elastic member, the elastic beam and the elastic member are simultaneously elastically deformed in the height direction, and the load force is transmitted to the load sensor via the base platform, the base platform is movable into and out of contact with a strain gauge of the load sensor.

2. The load detection apparatus of claim 1, further comprising a supporting portion supported on the housing, one end of the elastic beam is connected to the base platform, and the other end of the elastic beam is connected to the supporting portion.

3. The load detection apparatus of claim 2, wherein the supporting portion, the base platform and the elastic beam are integrated into a single component.

4. The load detection apparatus of claim 1, wherein one end of the elastic beam is connected to the base platform, and the other end of the elastic beam is connected to the housing.

5. The load detection apparatus of claim 4, wherein the housing, the base platform and the elastic beam are integrated into a single component.

6. The load detection apparatus of claim 1, further comprising a top platform floatingly supported on the base platform by the elastic member to allow the load force to be applied to the elastic member via the top platform.

7. The load detection apparatus of claim 6, wherein the top platform is configured to be blocked at a predetermined position by the housing to prevent the load sensor from being subjected to a pressing force greater than a predetermined pressing force when the load force applied to the top platform is greater than the predetermined pressing force.

8. The load detection apparatus of claim 6, wherein the elastic member is an elastic block made of an elastic material, the elastic block being provided between the base platform and the top platform.

9. The load detection apparatus of claim 8, wherein at least one of the base platform and the top platform is formed with a positioning groove adapted to position the elastic block, the elastic block being positioned in the positioning groove.

10. The load detection apparatus of claim 6, wherein the base platform, the elastic member and the top platform are integrated into a single component.

11. The load detection apparatus of claim 10, wherein the elastic member is an elastically deformable elastic structural body formed between the base platform and the top platform.

12. The load detection apparatus of claim 6, wherein the elastic member is a spring element provided between the base platform and the top platform.

13. The load detection apparatus of claim 12, wherein at least one of the base platform and the top platform is formed with a positioning groove adapted to position the spring element, the spring element being positioned in the positioning groove.

14. The load detection apparatus of claim 12, wherein the spring element is welded, bonded or attached to at least one of the base platform and the top platform.

15. The load detection apparatus of claim 1, wherein the load sensor is a resistive strain gauge sensor, a semiconductor strain gauge sensor or a capacitive sensor.

16. The load detection apparatus of claim 15, wherein the load sensor comprises a circuit board and the strain gauge provided on the circuit board and electrically connected to the circuit board.

17. The load detection apparatus of claim 16, further comprising a lead wire electrically connected to the load sensor and extending out of the housing for connection to a user.

18. The load detection apparatus of claim 1, wherein the load force is a pressing force or tension force applied to the elastic member.

* * * * *